United States Patent [19]
Yoshioka et al.

[11] Patent Number: 5,524,277
[45] Date of Patent: Jun. 4, 1996

[54] MOBILE RADIO COMMUNICATION APPARATUS FOR MONITORING TRANSMISSION AND RECEPTION CONDITIONS

[75] Inventors: Yuka Yoshioka; Masayuki Tanaka, both of Tokyo, Japan

[73] Assignee: Kabushiki Kaisha Toshiba, Kanagawa-ken, Japan

[21] Appl. No.: 295,386

[22] Filed: Aug. 25, 1994

[30] Foreign Application Priority Data

Aug. 26, 1993 [JP] Japan ................................. 5-211416

[51] Int. Cl.⁶ ...................................................... H04Q 7/00
[52] U.S. Cl. ..................... 455/33.1; 455/54.1; 455/56.1; 455/89
[58] Field of Search ................................. 455/33.1, 54.1, 455/56.1, 67.1, 69, 84, 89, 126, 226.2; 370/95.1, 95.3; 375/219

[56] References Cited

U.S. PATENT DOCUMENTS

| | | | |
|---|---|---|---|
| 5,109,538 | 4/1992 | Ikonen et al. | 455/126 |
| 5,276,686 | 1/1994 | Ito | 370/95.1 |
| 5,390,365 | 2/1995 | Enoki et al. | 455/33.1 |
| 5,396,496 | 3/1995 | Ito et al. | 370/95.1 |
| 5,404,579 | 4/1995 | Obayashi et al. | 455/89 |

Primary Examiner—Reinhard J. Eisenzopf
Assistant Examiner—Marsha D. Banks-Harold
Attorney, Agent, or Firm—Finnegan, Henderson, Farabow, Garrett & Dunner

[57] ABSTRACT

A mobile radio communication apparatus includes a switch which outputs a strength of a received radio frequency signal or a power strength of a radio frequency signal in accordance with an input of a switch control signal supplied from a switch control circuit. The switch control signal is supplied during a transmission time slot allotted to the mobile radio communication apparatus by the base station so that the switch outputs the power strength of the radio frequency signals in the same period of the transmission time slot and the strength of a received radio frequency signals in the same period of an other time slot. The strength of the received radio frequency signals and the power strength of the radio frequency signals are supplied to an analog-to-digital converter which converts the applied signal into a digital signal and supplies the digitalized signal to a level detector. The level detector detects a level of the strength of the radio frequency signals and a level of the power strength of the radio frequency signals which are used for monitoring condition of a transmission and a reception of the radio communication apparatus.

10 Claims, 5 Drawing Sheets

MOBILE RADIO COMMUNICATION APPARATUS FOR MONITORING TRANSMISSION AND RECEPTION CONDITIONS

BACKGROUND OF THE INVENTION

1. Field of the Invention

This invention relates to the field of radio communication apparatus such as mobile telephones, portable telephones and cordless telephones. More specifically, this invention relates to a mobile communication apparatus used as a mobile unit in a cellular radio system.

2. Description of the Related Art

Recently, many kinds of mobile communication systems have been developed and used.

One such system is a cellular radio communication system.

FIG. 5 shows a schematic view of a cellular radio communication system. This system has a control station CS, a plurality of base station, for example, BS1–BS3, and a plurality of mobile units, for example, MU1–MU4. The control station CS is connected to a wire telephone network NW through a wire circuit CL. The base stations BS1–BS3 are connected to the control stations CS through wire circuits CL1–CL3, respectively. The base stations BS1–BS3 form radio zones E1–E3, which are called cells, respectively. The mobile units MU1–MU4 located in the radio zones E1–E3 are connected to the base stations BS1–BS3 through radio channels.

In this kind of cellular system, for example, when mobile units MU1–MU4 move from the radio zone of the base station with which it has had communication, to another radio zone, the operation which is called "handoff control" is carried out. This "handoff control" is executed under the control of the control station CS. In this case, mobile units MU1–MU4 detect a level of "received signal strength" (RSS) of the radio signal which was transmitted from each of base stations. Then mobile units MU1–MU4 transmit the result of the detection to the control station CS. In accordance with the result of this detection, for example, the control station switches the base station so that the mobile station can receive the radio signal which indicates the highest level of the RSS.

On the other hand, mobile units MU1–MU4 have to transmit a radio signal. This radio signal has a certain power strength which is designated by the base station during the radio communication.

Thus, mobile units need to detect their level of the power strength which is called power detection signal "(PDS)". The signals, RSS and PDS are analog signals. Therefore, it is necessary that RSS and PDS should be converted into digital signals. Conventional mobile units utilize a number of A/D converters the same as the number of analog signals which are needed to be converted into digital signals. As a result, the size of circuits increases and the consumption of the electric power of such circuit also increases.

SUMMARY OF THE INVENTION

It is an object of the present invention to provide a compact mobile radio communication apparatus capable of monitoring the operative condition of a transmission or reception of radio frequency signals.

It is another object of the invention to provide a mobile radio communication apparatus capable of detecting signals which are used for monitoring the operative condition of the transmission or the reception of radio frequency signals with an appropriate timing.

It is another object of the invention to provide a compact mobile radio communication apparatus capable of maintaining the appropriate power detection level.

To attain one or more of the objects, as embodied and described herein, there is provided a mobile radio communication apparatus according to the present invention in which radio communication comprises a receiver for receiving radio frequency signals transmitted over the radio link, and for generating a strength of the received radio frequency signals as an analog signal; a transmitter for modulating signals into radio frequency signals, for transmitting the radio frequency signals over the radio link and for generating a power strength of the radio frequency signals as an analog signal; a switch, coupled to receive the generated strength of the .received radio frequency signals and the generated power strength of the radio frequency signals, for selectively outputting one of the generated strength signals outputted by the receiver and the transmitter; an analog-to-digital converter for converting into digital form the one of the generated strength signals outputted by the receiver and the transmitter supplied from the switch; and switch controller for supplying a switch control signal having one of first and second states to said signal switching means during a transmission time slot allotted to the mobile radio communication apparatus by the base station, said switch controller being response to the first and second states of the switch control signal to output the generated signals outputted by the receiver and the transmitter, respectively.

The mobile radio communication apparatus may further comprise a level detector for detecting a level of a digital signal from the analog-to-digital converter and for distinguishing a difference between the detected level of the digital signal and a predetermined level; a power amplifier included in the transmitter for applying radio signals for transmission; and a power controller for controlling a ratio of an amplification of the power amplifier in accordance with the output of the level detector.

The level detector is response to a requirement signal from the base station to supply the detected level of the received radio frequency signal strength to the transmitter for transmission.

The analog-to-digital converter may include an internal memory which memorizes data which are supplied from the switch, the switch controller supplies a write control signal to the analog-to-digital converter in accordance with the first and second states of the switch control signal, whereby the analog-to-digital converter writes the data in the internal memory.

The switch controller supplies a read control signal to the analog-to-digital converter, whereby the analog-to-digital converter outputs the strength of the received radio frequency signals as a digital signal or the power strength of the radio frequency signals as the digital signal. The switch controller may include a first AND gate which inputs a first data signal which indicates a "HIGH" level during the transmission time slot and a second data signal which indicates the "HIGH" level or a "LOW" level regardless of the transmission time slot, a second AND gate which inputs a third data signal which indicates opposite level of the second signal and a fourth data signal which indicates the "HIGH" level or the "LOW" level regardless of the transmission time slot, and a OR gate coupled to receive an output of the first AND gate and the second AND gate, when at least the one of the first data signal and the second data signal is the "LOW" level, the OR gate outputs a signal as the switch control signal to said signal switching means.

The mobile radio communication apparatus may further comprise a key for inputting the third data signal.

BRIEF DESCRIPTION OF THE DRAWINGS

The accompanying drawings, which are incorporated in and constitute a part of the specification, illustrate presently preferred embodiment of the invention, and together with the general description given above and the detailed description of a preferred embodiment given below, serve to explain the principles of the invention.

DETAILED DESCRIPTION OF THE PREFERRED EMBODIMENTS

Figure 1:
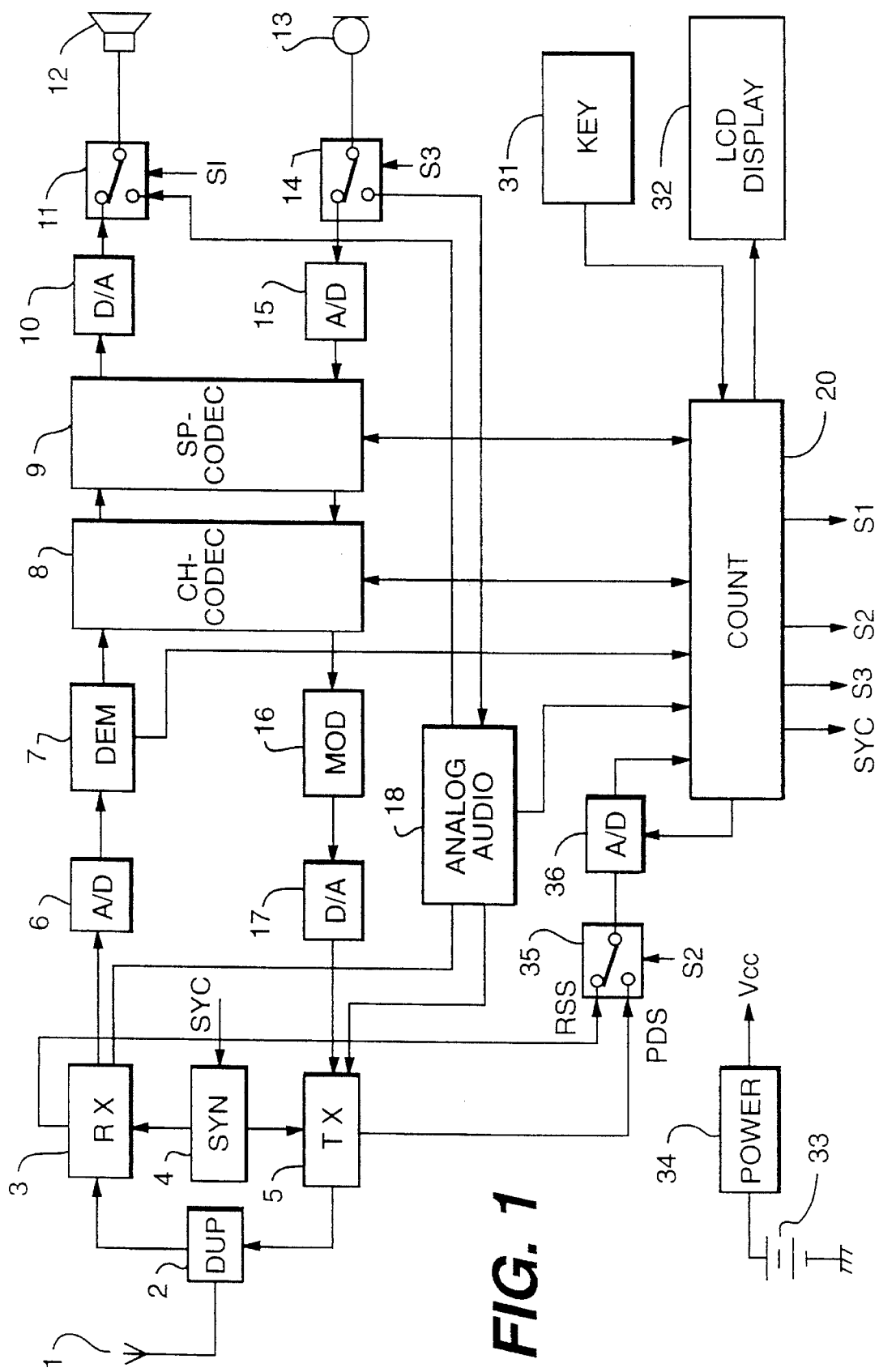
FIG. 1 is a circuit diagram, showing a mobile cellular radio communication apparatus according to an embodiment of the invention.

FIG. 1 shows a circuit diagram, showing a mobile cellular radio communication apparatus according to an embodiment of the invention.

This mobile cellular radio communication apparatus is used as a mobile unit of a dual mode cellular radio communication system. This dual mode cellular radio communication system is a system which employs an analog mode and a digital mode.

First, the portion of the circuit related to the digital mode is described.

A radio frequency signal, supplied from each of the base stations BS1–BS3 through a corresponding one of digital speech channels when the digital mode is set, is received by an antenna 1 and then input to a receiver 3 via a duplexer 2. Receiver 3 combines the radio frequency signal with a receiver oscillation signal output from a frequency synthesizer 4, thereby forming an intermediate frequency signal. The frequency of the receiver oscillation signal from frequency synthesizer 4 is controlled by a channel control signal SYC output from a controller 20. The intermediate frequency signal is converted into a digital signal by means of an A/D converter 6, and is then input to a digital demodulator 7. Demodulator 7 demodulates the digital signal into a digital base band signal. The digital base band signal includes a digital speech signal and a digital control signal. The digital control signal is supplied to controller 20, where the signal is recognized.

The digital speech signal has its demodulated waveform equalized by means of an equalizer (not shown), and is then supplied to a channel-encoder/decoder (hereinafter referred to as "channel-codec") 8. Channel-codec 8 performs decoding processing for correcting an error in the digital speech signal supplied from the equalizer, and outputs the corrected digital speech signal to a speech-encoder/decoder (hereinafter referred to as "speech-codec") 9.

Speech-codec 9 performs speech decoding processing of the corrected digital speech signal. The speech signal output from speech-codec 9 is converted to an analog speech signal by means of a D/A converter 10, and is then input to an analog switch 11.

Analog switch 11 is controlled by a switch control signal S1 supplied from controller 20 so that switch 11 selectively outputs the analog speech signal output from the speech-codec 9 when the digital mode is set. Thus, the analog speech signal which is output from the D/A converter 10 is supplied to a speaker 12 via analog switch 11, and a speech corresponding to the speech signal is output therefrom.

Still with respect to the digital mode, a transmission signal which is output from a microphone 13 is input to an analog switch 14. Switch 14 is controlled by a switch control signal S3 supplied from controller 20 so that switch 14 selectively inputs the transmission signal to speech-codec 9 when the digital mode is set. Thus, the transmission signal is converted into a digital transmission signal by means of an A/D converter 15 and is then input to speech-codec 9.

Speech-codec 9 performs a speech encoding processing of the digital transmission signal. The digital transmission signal which is output from speech-codec 9 is input to channel-codec 8, together with the digital control signal which is supplied from controller 20. Channel-codec 8 performs encoding for correcting errors in the digital transmission signal and the digital control signal. The encoded digital transmission signal is input to a digital modulator 16.

Modulator 16 generates a modulation signal which is obtained by subjecting the digital transmission signal to a π/4 shifted DQPSK modulation. The modulation signal is converted into an analog signal by means of a D/A converter 17 and is then input to a transmitter 5. Transmitter 5 synthesizes the modulation signal and a transmitter oscillation signal which is output from the frequency synthesizer 4. As a result, transmitter 5 generates a radio transmission signal which has high frequency and high amplitude. Thus the radio transmission signal is output to antenna 1 via duplexer 2, and transmitted to the base station.

The analog mode is described next when the analog mode is set, a radio frequency signal, which is supplied from each of the base station BS1–BS3 through a corresponding one of analog speech channels, is received by antenna 1 and then input to receiver 3 via duplexer 2. Receiver 3 converts the radio frequency signal into an intermediate frequency signal, which is output to an analog audio circuit 18. Analog audio circuit 18 performs a frequency demodulation of the intermediate frequency signal and then performs speech amplification of the demodulated signal. An analog signal which is output as a base band signal from analog audio circuit 18 is input to analog switch 11. Switch 11 is controlled by switch control signal S1. Switch 11 operated to direct the speech signal to speaker 12 and speech corresponding to the speech signal is output therefrom.

An explanation of a transmission of a signal in the analog mode is provided next.

A transmission signal which is output from the microphone 13 is input to analog switch 14. Switch 14 is controlled by switch control signal S3 supplied from controller 20 so that switch 14 selectively inputs the transmission signal to analog audio circuit 18 when the analog mode is set. Thus, the transmission signal is input to analog audio circuit 18 via analog switch 14. Circuit 18 generates a modulation signal obtained by subjecting the transmission signal to FM modulation, and inputs the modulation signal to transmitter 5. Transmitter 5 combines the modulation signal with a transmitter oscillation signal output from the frequency synthesizer 4. Transmitter 5 generates a radio frequency signal which has high frequency and high amplitude.

This radio frequency signal is output to antenna 1 via duplexer 2, and is then transmitted to the base station.

Referring to the FIG. 1, a key pad 31, a display 32 and a power source circuit 34 are provided. The key pad 31 includes numeric digit keys used as dial keys, a one-touch dial key and a function key group. The function key group includes a sending key to be operated to originate a call, an end key to be operated to finish the call, and an alphabet input key to be operated to input alphabetic characters on the numeric keys. The display 32 is provided, for example, as a liquid crystal display (LCD) which shows the operative condition of the telephone unit or the telephone number of a destination terminal, etc., in response to a signal supplied from the controller 20. Power source circuit 34 generates a desired operational voltage Vcc on the basis of the output of a battery 33, and supplies the voltage to the above-described various circuits.

When receiver 3 receives a signal which is transmitted from the base station, receiver 3 detects the received signal strength (RSS) which is formed as an analog voltage signal. The RSS signal is used for monitoring a level of the received signal strength. For example, if this level decreases, it is an indication that the mobile unit is moving to another radio zone.

When transmitter 5 transmits a signal, a power amplifier circuit (not shown) of transmitter 5 detects the power detection signal (PDS) which is also formed as an analog voltage signal. The PDS signal is used for monitoring a level of the power of the transmission signal. For example, if this level decreases from a predetermined level, it is an indication that a ratio of amplification of the power amplifier of the transmitter 5 should be increased as described later.

Although the RSS and PDS signals are generated in analog form, it is desired to convert these signals to digital for future processing. In accordance with the present embodiment, only one A/D converter is provided for converting these analog signals to digital form.

As shown in FIG. 1, RSS and PDS are input to a switch 35. This switch 35 is controlled by the switch control signal S2 which is supplied from the controller 20, switch 35 selects one signal in accordance with signal S2. The selected signal which is RSS or PDS, is input to an A/D converter 36. This A/D converter 36 converts the applied RSS or PDS into a digital signal for the preparation of detecting the level of RSS or the level of PDS.

Figure 2:
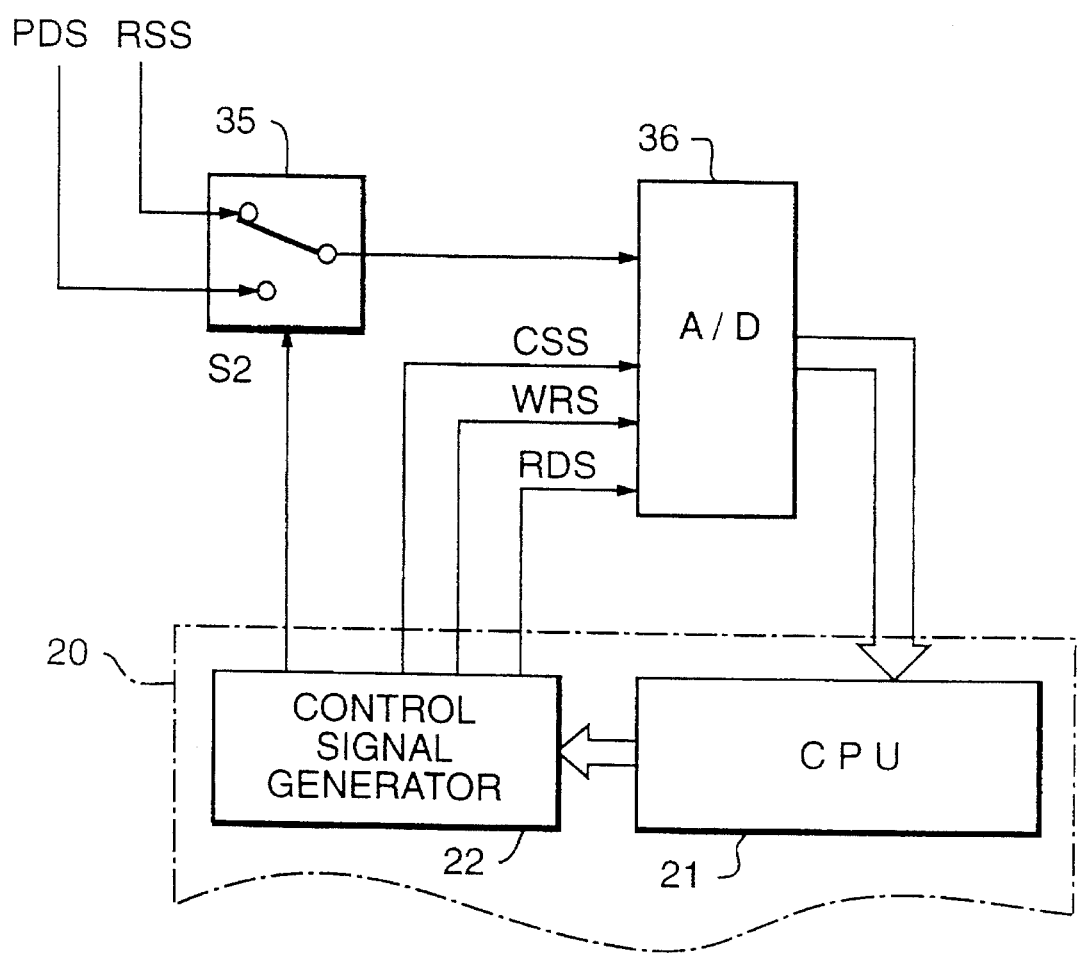
FIG. 2 is a circuit diagram, showing a main portion of the mobile cellular radio communication apparatus according to the embodiment of the invention.

FIG. 2 is a block diagram which illustrates the switch 35, A/D converter 36, and the controller circuit 20.

As shown in FIG. 2, the controller 20 includes a CPU 21 and a control signal generator 22. CPU 21 is, for example, in the form of a microcomputer. Control signal generator 22 (hereinafter referred to as "CSG") is, for example, in the form of a gate-array.

CPU 21 performs a connection control process and a call control process for the radio channel in accordance with a predetermined procedure, therefore CPU 21 notices a transmission timing. CPU 21 also notices that a transmission time slot and a reception time slot which are allotted to the mobile stations by the control station when the mobile radio communication apparatus is used in a TDMA (time division multiple access) cellular radio system as described later. CPU 21 has a signal detection control means (not shown). The signal detection control means outputs to CSG 22 a CSG control signal corresponding to a timing of a transmission, in response to which CSG 22 generates control signals to control the operation of the switch 35 and A/D converter 36. The signal detection control means detects a level of the signal which is output from A/D converter 36. CSG 22 supplies the switch control signal S2 to switch 35 and controls switch 35 in accordance with the CSG signal which is output by CPU 21, and also supplies a chip select signal (CSS), a write control signal (WRS) and a read control signal (RDS) to A/D converter 36 respectively, to thereby control the operation of A/D converter 36.

An explanation of the operation of the elements as shown in FIG. 2 is provided next.

Figure 3:
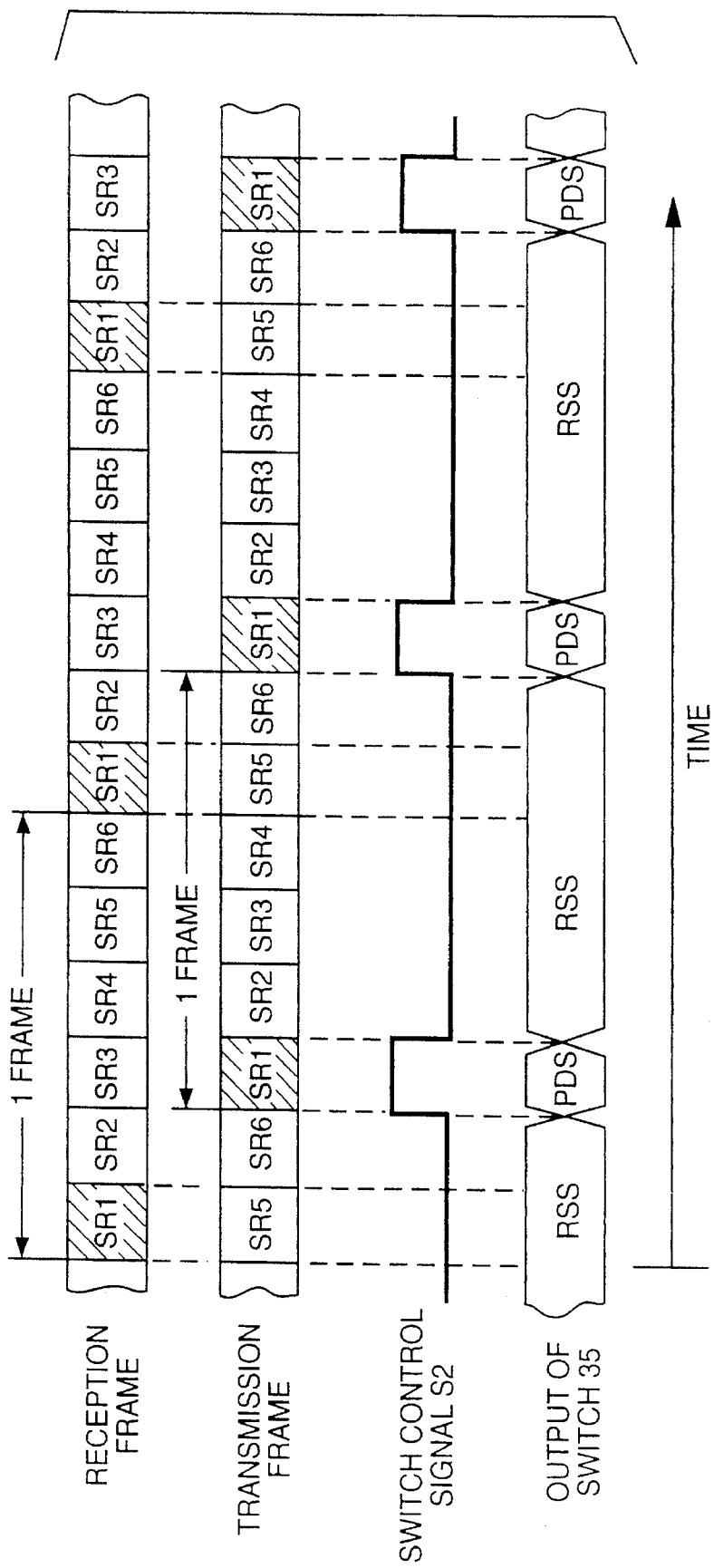
FIG. 3 is a timing chart for explaining the operation of the mobile cellular radio communication apparatus shown in FIG. 1 and FIG. 2.

It is assumed that the mobile radio communication apparatus shown in FIG. 1 and 2 is used in a time division multiple access (TDMA) cellular radio system characterized by the signal shown in FIG. 3. Operation is described for the digital mode. Referring to FIG. 3(a) and (b), a reception frame and a transmission frame are provided. In the reception frame and the transmission frame, one (1) frame is divided into six (6) time slots SR1–SR6. These time slots are allotted to each of mobile units by the control station CS. For example, the mobile unit MU1 uses the time slot SR1 for transmission and reception.

In the present example, the mobile radio communication apparatus uses the time slot SR1.

First, operation at the time of transmission is described.

CPU 21 supplies the CSG control signal to CSG 22 for the period of the transmission time slot SR1. The CSG control signal is generated during the transmission time slot SR1.

As shown in FIG. 3(c), CSG 22 outputs the switch control signal S2 corresponding to the CSG control signal in the period of the transmitting time slot SR1. In response, switch 35 selects PDS.

Therefore in the period of the transmitting time slot SR1, A/D converter 36 receives PDS. During this time, CSG 22 supplies the chip select signal (CSS), the write control signal (WRS) to the A/D converter 36 as described above, so that A/D converter 36 writes analog data of the PDS in an internal memory (not shown) and converts the analog data into digital data. Next, CSG 22 inputs the read control signal (RDS) so that digital data of the PDS is extracted from A/D converter 36 into CPU 21. In CPU 21, the level of the PDS is detected and the detected level of PDS is compared with a predetermined level which is designated by the control station via the base station. Further CPU 21 distinguishes a difference between the detected level of PDS and the level of the predetermined level. If the detected level of PDS is lower than the predetermined level, CPU 21 sends a control signal (not shown) to the power amplifier of the transmitter 5 to increase the ratio of amplification up to the predetermined level. Feedback control of the power amplifier of the transmitter 5 is used to carry out such power adjustment.

Secondly, operations at the time of reception are as follows. Upon the termination of the transmission time slot, CPU 21 stops supplying the CSG control signal to CSG 22. Alternatively, CPU 21 supplies a signal which designates a termination of the supply of the switch control signal S2. As a result, the supply of the switch control signal S2 to switch 35 is terminated so that switch 35 changes automatically from outputting signal PDS to outputting another signal, i.e., RSS.

As shown in FIG. 3(d), in the reception time slot SR1, switch 35 outputs RSS. In this time, CSG 22 supplies the chip select signal (CSS), the write control signal (WRS) to the A/D converter 36 as described above, so that A/D converter 36 writes analog data of the RSS in the internal memory (not shown) and converts analog data into digital data. Next CSG 22 inputs the read control signal (RDS) so that digital data of the RSS is extracted from A/D converter 36 into CPU 21. In CPU 21, the level of the RSS is detected. If the control station CS orders the mobile unit to transmit the result of the detection, then this detected level is transmitted to the control station.

Further, in order to detect the level of RSS of received signals which are transmitted from the base station in an analog radio zone in an idle time slot, e.g., any time of time slots SR2–SR6, CPU 21 instructs that the channel of communication should be changed by frequency synthesizer 4.

In the present for example, the idle time slot is any time slot is except the transmission time slot SR1 and the reception time slot SR1.

In the idle time slot, switch 35 outputs RSS of the reception signal which is received in receiver 3. RSS is input to A/D converter 36 and converted into the digital signal in the same way as described above. In CPU 21, the level of RSS is detected. If the control station CS orders the mobile unit to transmit the result of the detection, then this detected level is transmitted to the control station.

The control station CS judges whether the "handoff control" is needed or not on the basis of the detected level of RSS which is supplied from the mobile station. If the control station judges that the "handoff control" is necessary, then the control station carries out the "handoff control" which is the switching of the communication channel from the former base station to a new base station which supplies a signal indicating the highest level of RSS in the mobile unit.

In this embodiment, switch 35 and controller 20 which controls the operation of both switch 35 and A/D converter 36 are provided, so that it enables use of only one A/D converter to convert two different analog signals into two digital signals which are used for monitoring the operative condition of the transmission and the reception. As a result, a more compact and lightweight mobile unit can be provided.

Further, this embodiment enables the saving of electric power because only one A/D converter is used in comparison to use of multiple A/D converters in the conventional mobile unit.

This invention is not limited to the above described embodiment. For example, in the above embodiment, the switch control signal (S2) is generated from CSG 22 with the same timing of the transmitting slot. However, the switch control signal (S2) can be generated with an arbitrary timing.

Figure 4:
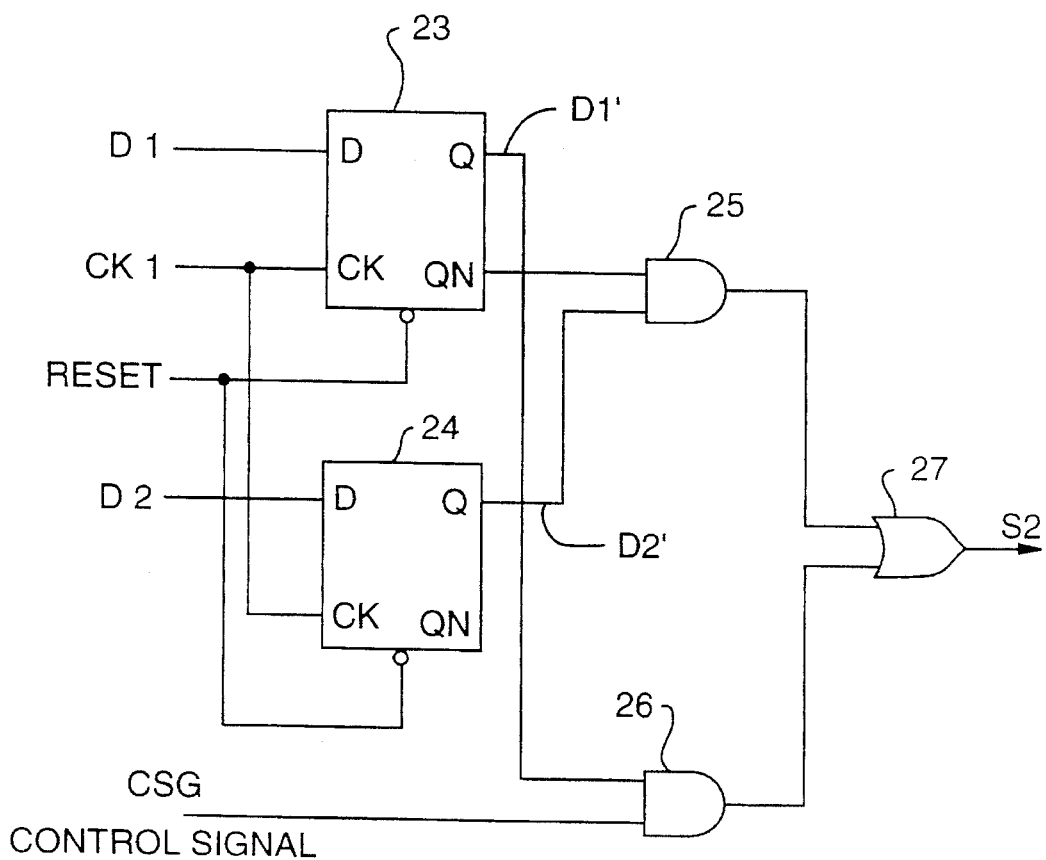
FIG. 4 is one example of a logic circuit of a control signal generator, showing a mobile cellular radio communication apparatus according to the embodiment of the invention.
Figure 5:
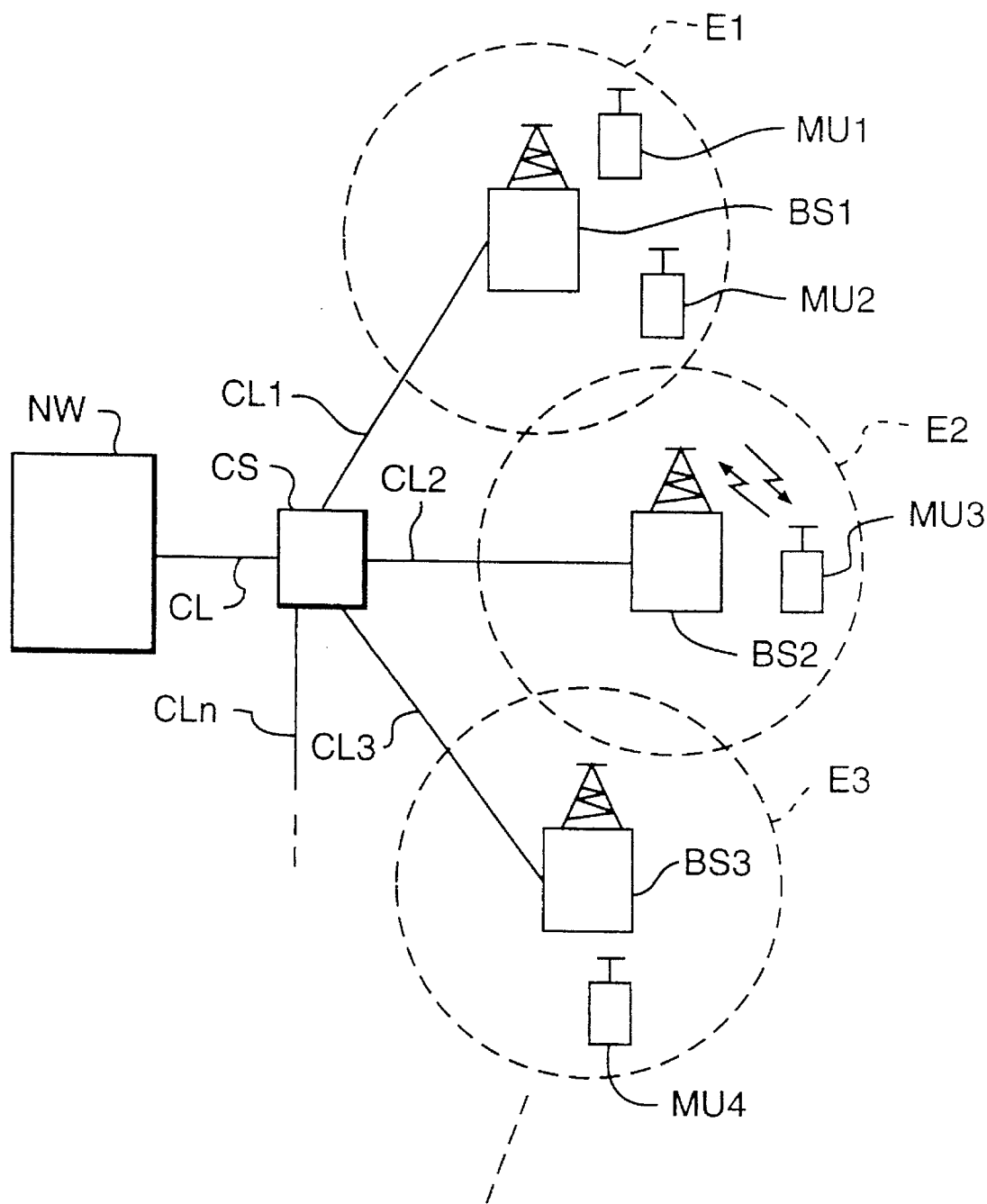
FIG. 5 shows an example of an arrangement of a cellular radio communication system.

FIG. 4 shows a logic circuit of a portion of the CSG.

An output signal D1' of a D-type flip-flop 23 is fixed at a logic "1". In this situation, if the CSG control signal which is synchronized with the transmission slot SR1, is supplied from CPU to AND gate 26, a OR gate 27 enables to output a signal as S2. As a result, S2 is generated in synchronized with the transmission slot SR1. D1 and CK1 are for example supplied from CPU 21.

Alternatively, the output signal D1' of the D-type flip-flop 23 can be fixed at a logic "0". In this situation, if an output signal of the D-type flip-flop 24 is set at a logic "1" or a logic "0" for example in accordance with the user's key operation, then AND gate 25 becomes logic "1" or a logic "0", and it allows S2 to be generated with an arbitrary timing.

Although the embodiment of the present invention applied to a mobile unit of a cellular radio telephone system have been described, the present invention may be applied to any other kind of apparatus having A/D converters or D/A converters which selectively convert plural analog signals into digital signals or plural digital signals into analog signals, including but not limited to a base station apparatus of a cellular radio telephone system, a portable telephone, and a cordless phone.

Other variations, such as arrangement of and placement of analog switches, control process, and control command of the controller, may be made within the scope of the present invention.

What is claimed is:

1. A mobile radio communication apparatus for use in a cellular radio system in which radio communication signals are transmitted over a radio link between the mobile radio communication apparatus and a base station, the mobile radio communication apparatus comprising:

receiving means for receiving first radio frequency signals transmitted over the radio link, and for generating a strength of the received first radio frequency signals as a first analog signal;

transmitting means for modulating signals into second radio frequency signals, for transmitting the second radio frequency signals over the radio link, and for generating a power strength of the second radio frequency signals as a second analog signal;

signal switching means, coupled to receive the first analog signal and the second analog signal, for selectively outputting one of the first and second analog signals;

an analog-to-digital converting means for converting into a digital signal the one of the first and second analog signals supplied from the signal switching means; and switch control means for supplying a switch control signal having one of first and second states to said signal switching means during a transmission time slot allotted to the mobile radio communication apparatus by the base station, said signal switching means being responsive to the first and second states of the switch control signal to output said one of the first and second analog signals.

2. The mobile radio communication apparatus according to claim 1, further comprising:

level detecting means for detecting a level of the digital signal output from said analog-to-digital converting means and for distinguishing a difference between the detected level of the digital signal and a predetermined level;

a power amplifier included in said transmitting means for applying radio signals for transmission; and power control means for controlling a ratio of an amplification of said power amplifier in accordance with the output of the level detecting means.

3. The mobile radio communication apparatus according to claim 2 wherein said level detecting means is responsive to a requirement signal from the base station to supply the detected digital signal to said transmitting means for transmission.

4. The mobile radio communication apparatus according to claim 1, wherein the cellular radio system is a TDMA cellular radio system.

5. The mobile radio communication apparatus according to claim 1, wherein the cellular radio system is a dual mode cellular radio communication system.

6. The mobile radio communication apparatus according to claim 1, wherein the cellular radio system is an analog mode cellular radio communication system.

7. A mobile radio communication apparatus for use in a cellular radio system in which radio communication signals are transmitted over a radio link between the mobile radio communication apparatus and a base station, the mobile radio communication apparatus comprising:

receiving means for receiving radio frequency signals transmitted over the radio link, and for generating a strength of the received radio frequency signals as an analog signal;

transmitting means for modulating signals into radio frequency signals, for transmitting the radio frequency signals over the radio link and for generating a power strength of the radio frequency signals as an analog signal;

signal switching means, coupled to receive the generated strength of the received radio frequency signals and the generated power strength of the radio frequency signals, for selectively outputting one of the generated strength signals outputted by the receiving means and the transmitting means;

an analog-to-digital converting means for converting into digital form the one of the generated strength signals outputted by the receiving means and the transmitting means supplied from the signal switching means; and switch control means for supplying a switch control signal having one of first and second states to said signal switching means during a transmission time slot allotted to the mobile radio communication apparatus by the base station, said signal switching means being responsive to the first and second states of the switch control signal to output said one of the generated signals outputted by the receiving means and the transmitting means, respectively;

wherein said analog-to-digital converting means further includes an internal memory which memorizes data supplied from said switching means, said switch control means supplies a write control signal to said analog-to-digital converting means in accordance with the first and second states of the switch control signal, whereby the analog-to-digital converting means writes the data in the internal memory.

8. A mobile radio communication apparatus for use in a cellular radio system in which radio communication signals are transmitted over a radio link between the mobile radio communication apparatus and a base station, the mobile radio communication apparatus comprising:

receiving means for receiving radio frequency signals transmitted over the radio link, and for generating a strength of the received radio frequency signals as an analog signal;

transmitting means for modulating signals into radio frequency signals, for transmitting the radio frequency signals over the radio link and for generating a power strength of the radio frequency signals as an analog signal;

signal switching means, coupled to receive the generated strength of the received radio frequency signals and the generated power strength of the radio frequency signals, for selectively outputting one of the generated strength signals outputted by the receiving means and the transmitting means;

an analog-to-digital converting means for converting into digital form the one of the generated strength signals outputted by the receiving means and the transmitting means supplied from the signal switching means; and switch control means for supplying a switch control signal having one of first and second states to said signal switching means during a transmission time slot allotted to the mobile radio communication apparatus by the base station, said signal switching means being responsive to the first and second states of the switch control signal to output said one of the generated signals outputted by the receiving means and the transmitting means, respectively;

wherein said switch control means supplies a read control signal to said analog-to-digital converting means, whereby said analog-to-digital converting means outputs the strength of the received radio frequency signals as a digital signal or the power strength of the radio frequency signals as the digital signal.

9. A mobile radio communication apparatus for use in a cellular radio system in which radio communication signals are transmitted over a radio link between the mobile radio communication apparatus and a base station, the mobile radio communication apparatus comprising:

receiving means for receiving radio frequency signals transmitted over the radio link, and for generating a strength of the received radio frequency signals as an analog signal;

transmitting means for modulating signals into radio frequency signals, for transmitting the radio frequency signals over the radio link and for generating a power strength of the radio frequency signals as an analog signal;

signal switching means, coupled to receive the generated strength of the received radio frequency signals and the generated power strength of the radio frequency signals, for selectively outputting one of the generated strength signals outputted by the receiving means and the transmitting means;

an analog-to-digital converting means for converting into digital form the one of the generated strength signals outputted by the receiving means and the transmitting means supplied from the signal switching means; and switch control means for supplying a switch control signal having one of first and second states to said signal switching means during a transmission time slot allotted to the mobile radio communication apparatus by the base station, said signal switching means being responsive to the first and second states of the switch control signal to output said one of the generated signals outputted by the receiving means and the transmitting means, respectively;

wherein said switch control means further includes a first AND gate which inputs a first data signal which indicates a "HIGH" level during the transmission time slot and a second data signal which indicates the "HIGH" level or a "LOW" level regardless of the transmission time slot, and a second AND gate which inputs a third data signal which indicates an opposite level of the second signal and a fourth data signal which indicates the "HIGH" level or the "LOW" level regardless of the transmission time slot, and an OR gate coupled to receive an output of the first AND gate and the second AND gate, when at least one of the first data signal and the second data signal is the "LOW" level, the OR gate outputs a signal as the switch control signal to said signal switching means.

10. The mobile radio communication apparatus according to claim 9, further comprising:

a key means for inputting the third data signal.

* * * * *